US011662932B2

(12) United States Patent
Sharma et al.

(10) Patent No.: US 11,662,932 B2
(45) Date of Patent: May 30, 2023

(54) TIERED STORAGE SYSTEM WITH DEFRAGMENTATION BASED ON WEIGHTED FLASH FRAGMENTATION FACTOR

(71) Applicant: Western Digital Technologies, Inc., San Jose, CA (US)

(72) Inventors: Amit Sharma, Bengaluru (IN); Dinesh Kumar Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/358,786

(22) Filed: Jun. 25, 2021

(65) Prior Publication Data

US 2022/0413729 A1    Dec. 29, 2022

(51) Int. Cl.
*G06F 3/06*      (2006.01)
*G06F 12/1009*   (2016.01)

(52) U.S. Cl.
CPC .......... *G06F 3/0644* (2013.01); *G06F 3/0608* (2013.01); *G06F 3/0659* (2013.01); *G06F 3/0679* (2013.01); *G06F 12/1009* (2013.01)

(58) Field of Classification Search
CPC .... G06F 3/0685; G06F 3/0616; G06F 3/0646; G06F 3/0608; G06F 3/0644; G06F 3/0679; G06F 12/023; G06F 12/0246
See application file for complete search history.

(56) References Cited

U.S. PATENT DOCUMENTS

| | | | |
|---|---|---|---|
| 8,782,344 B2 | 7/2014 | Talagala et al. | |
| 8,819,375 B1* | 8/2014 | Pruett | G06F 13/28 |
| | | | 707/693 |
| 9,519,578 B1 | 12/2016 | Kuzmin et al. | |
| 10,776,317 B1* | 9/2020 | Veeraswamy | G06F 3/0673 |
| 10,884,915 B1 | 1/2021 | Kuzmin et al. | |
| 2010/0293354 A1* | 11/2010 | Perez | G06F 16/1724 |
| | | | 711/170 |
| 2013/0311749 A1* | 11/2013 | Dawkins | G06F 3/0649 |
| | | | 711/206 |
| 2014/0215129 A1* | 7/2014 | Kuzmin | G06F 12/0246 |
| | | | 711/103 |
| 2015/0032942 A1* | 1/2015 | de la Iglesia | G06F 12/0246 |
| | | | 711/103 |
| 2015/0220552 A1* | 8/2015 | Duzly | G06F 16/00 |
| | | | 707/693 |
| 2017/0083261 A1* | 3/2017 | Seo | G06F 3/0653 |
| 2018/0217926 A1* | 8/2018 | Ogawa | G06F 3/0679 |
| 2021/0255950 A1* | 8/2021 | Tan | G06F 3/064 |

* cited by examiner

*Primary Examiner* — Tracy A Warren
(74) *Attorney, Agent, or Firm* — Patent Law Works LLP

(57) ABSTRACT

Systems and method for providing tier selection for data based on a weighted flash fragmentation factor. A weighted flash fragmentation factor is determined indicating a severity of fragmentation in a non-volatile storage based on a logical block address range in a logical-to-physical mapping table for data from a host device to be stored in the tiered data storage system. The factor is shared with the host device to determine a tier selection. The data is stored according to the tier selection based on the factor.

20 Claims, 10 Drawing Sheets

TIERED STORAGE SYSTEM WITH DEFRAGMENTATION BASED ON WEIGHTED FLASH FRAGMENTATION FACTOR

TECHNICAL FIELD

The present disclosure generally relates to data storage systems, and in a more particular example, to tiered data storage systems.

BACKGROUND

Tiered storage in a storage system is a developing technique used in data base management of servers and data centers. Servers handle vast amounts of data, some of which are accessed more frequently than others. Accordingly, data may be classified into multiple tiers based on frequency of usage (e.g., "hotness of data"). Further, tiered storage systems may include a variety of different types of storage media. For example, a tiered storage system may include faster and more expensive media that provides quicker access times (e.g., <100 nsec) for storing data that is "hot" or accessed frequently, a moderately fast and less expensive media that provides moderate access times (e.g., <100 μsec) for storing data that is "warm" or less frequently accessed, and slower and inexpensive media that provides slower access times (e.g., <10 msec) for storing data that is "cold" or infrequently accessed.

Often, the "hotness" of data is not fully appreciated until after the data has first been written to the storage system. Indiscriminate writing of the data to an incorrect tier within the storage system, particularly a tier that utilizes storage devices having finite lifecycles, results in subsequent relocation of the data causing an unnecessary reduction in the lifespan of the storage media.

Further, incorrectly writing data to a mid-tier type of media, such as a solid-state storage device (SSD) which is incapable of being "written-in-place," may result in various portions of the data being dispersed or fragmented across the storage media in a tier. Such fragmentation of data increases access times because data is not able to be sequentially accessed in sequential storage blocks.

Further, fragmentation of data reduces the lifecycle of the storage media when the storage media is subjected to unnecessary erase cycles resulting from housekeeping and attempted defragmentation of data within the storage media. For example, SSDs are not "write-in-place" devices which allow subsequent data to be overwritten. Instead, SSDs require all valid data in a block to be copied to a different block before the original block may be erased and reused, resulting in a reduced lifecycle of the device. Therefore, there is a need to improve the initial placement of the data to reduce unnecessary writes to storage media in various tiers of a storage system.

SUMMARY

Various aspects for reducing the fragmentation of data stored in tiered data storage devices, are described.

One general aspect includes a computer-implemented method that includes: determining, responsive to a proposed storage operation from a host device targeting a host logical block address, a weighted flash fragmentation factor for a data storage device, wherein the weighted flash fragmentation factor: indicates a severity of fragmentation in a storage device media of the data storage device; sharing the weighted flash fragmentation factor with the host device for use by the host device in a tier selection for the proposed storage operation; receiving, responsive to the tier selection by the host device, the proposed storage operation; and executing, by the data storage device, the proposed storage operation.

Implementations may include one or more of the following features. The method wherein the weighted flash fragmentation factor is based on a difference in access time of previously stored data in the data storage device. The method wherein the difference in access time is based on a changed in a quantity of sense operations in the data storage device. The method wherein the weighted flash fragmentation factor is further based on a proposed change to a logical-to-physical mapping table of the data storage device corresponding to the proposed storage operation. The method wherein determining the weighted flash fragmentation factor further comprises determining the weighted flash fragmentation factor for each logical block address range in the data storage device. The method wherein sharing the weighted flash fragmentation factor to the host device comprises sharing the weighted flash fragmentation factor for each logical block address range in the data storage device using a buffer selected from: a host managed buffer; and a controller memory buffer. The method wherein the determining the weighted flash fragmentation factor is responsive to: receiving a request to calculate the weighted flash fragmentation factor for the logical host block address of the proposed storage operation. The method wherein the tier selection for the proposed storage operation is based on: an anticipated access frequency of data in the proposed storage operation; and the weighted flash fragmentation factor. The method further comprising: identifying, responsive to the proposed storage operation from the host device, a gap in logical block addresses in a logical-to-physical mapping table; and requesting future data be stored according to the gap in the logical block addresses in the data storage device. The method further comprising: identifying, responsive to the proposed storage operation from the host device, a logical block address range of a fragment of data that is included in another range of logical block addresses; and requesting the fragment of data be moved to tier different than the data storage device.

Another general aspect includes a data storage device including a logical-to-physical mapping table configured to store a mapping of logical block addresses to physical addresses of a storage device media; fragmentation manager configured to: determine, responsive to a proposed storage operation from a host device targeting a host logical block address, a weighted flash fragmentation factor, wherein the weighted flash fragmentation factor for the data storage device, wherein the weighted flash fragmentation factor indicates a severity of fragmentation in the storage device media based on a logical block address range of data to be stored in the storage device media; and share the weighted flash fragmentation factor with the host device for use by the host device in a tier selection for the proposed storage operation; and multi-tier memory mapping module configured to: receive, responsive to the tier selection by the host device, the proposed storage operation; and execute, by the data storage device, the proposed storage operation.

Implementations may include one or more of the following features. The data storage device wherein the weighted flash fragmentation factor is based on a difference in access time of previously stored data in the data storage device. The data storage device wherein the difference in access time is based on a changed in a quantity of sense operations in the data storage device. The data storage device wherein the weighted flash fragmentation factor is further based on a proposed change to the logical-to-physical mapping table of the data storage device corresponding to the proposed storage operation. The data storage device wherein to generate the weighted flash fragmentation factor further comprises executable instructions to: generate the weighted flash fragmentation factor for each logical block address range in the storage device media. The data storage device wherein to share the weighted flash fragmentation factor to the host device comprises executable instructions to: share the weighted flash fragmentation factor for each logical block address range in the data storage device in one of a host managed buffer and a controller memory buffer. The data storage device wherein to generate the weighted flash fragmentation factor is in response to executable instructions to: receive a request to calculate the weighted flash fragmentation factor for a logical block address of data. The data storage device wherein the tier selection for the proposed storage operation is based on: an anticipated access frequency of data in the proposed storage operation: and the weighted flash fragmentation factor. The data storage device further comprising executable instructions to: identify a gap in logical block addresses in the logical-to-physical mapping table in the data storage device; identify a logical block address range of a fragment of data that is included in another range of logical block addresses; and request the fragment of data be moved to tier different than the data storage device.

Still another general aspect includes a data storage device including: a non-volatile storage medium; means for determining, responsive to a proposed storage operation from a host device targeting a host logical block address, a weighted flash fragmentation factor for the data storage device, wherein the weighted flash fragmentation factor indicates a severity of fragmentation in a storage device media of the data storage device; means for sharing the weighted flash fragmentation factor with the host device for use by the host device in a tier selection for the proposed storage operation; means for receiving, responsive to the tier selection by the host device, the proposed storage operation; and means for executing, by the data storage device, the proposed storage operation.

The various embodiments advantageously apply the teachings data storage networks and systems to improve the functionality of such computer systems. The various embodiments include operations to locations for storing data in a data storage system based on fragmentation of the data storage media, namely using a weighted flash fragmentation factor, in addition to other data factors such as the "hotness" of the data. That is, the various embodiments disclosed herein include hardware and/or software with functionality to improve the efficiency and scalability of tiered data management operations, based on managing storage tier configurations across a plurality of peer storage devices. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
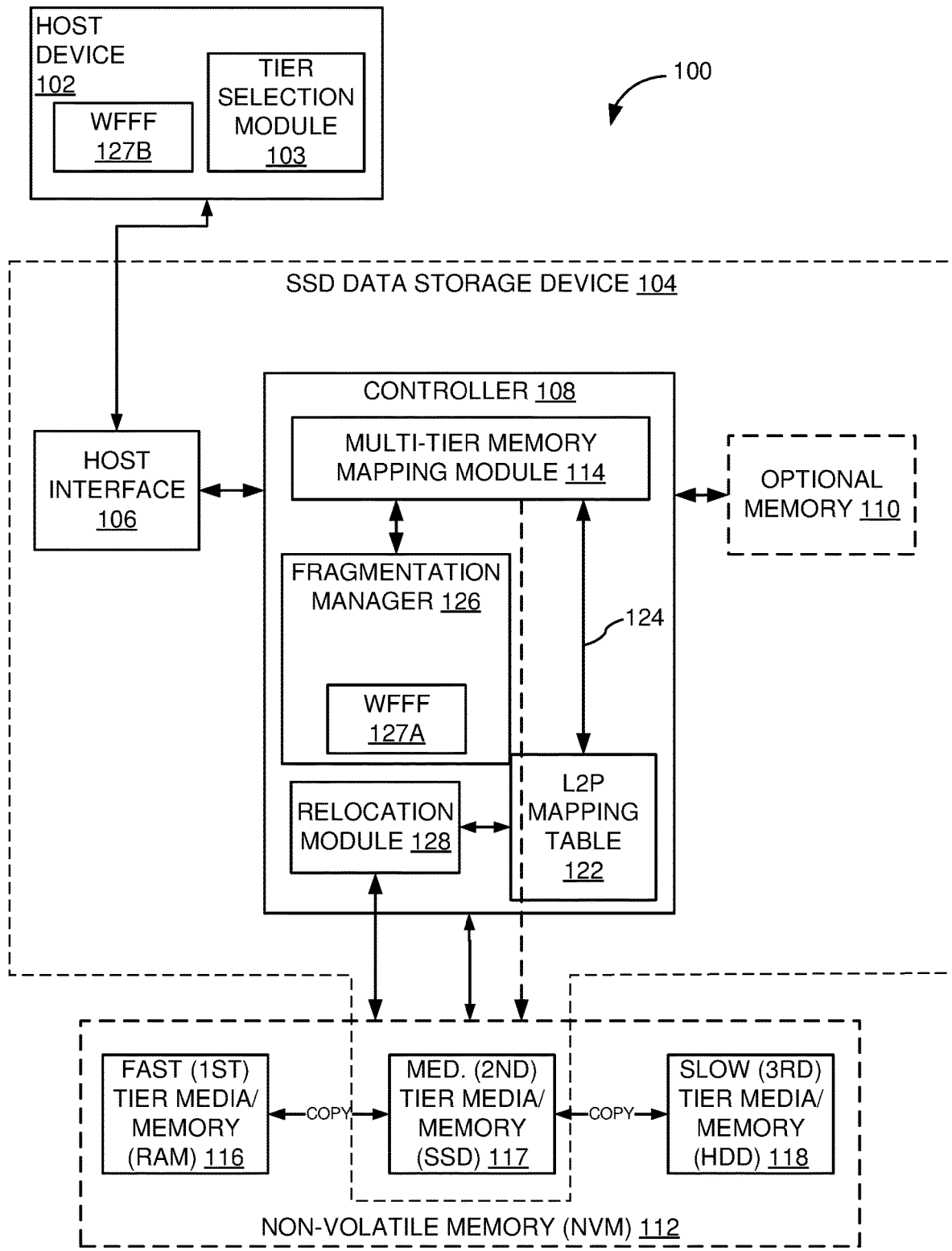
FIG. 1 illustrates an example memory system including an SSD storage device configured in accordance with one or more aspects of the disclosure.

Tiered storage is a commonly used paradigm in data base management servers/data centers. Servers have to handle vast amounts of data, some of which are accessed more frequently than others. Data is classified into multiple tiers based on frequency of usage (hotness of data). Dynamic Random-Access Memory (DRAM), Magnetoresistive Random Access Memory (MRAM), or other Random Access Memory (RAM) may be example media used in a fast or as a first tier in a multi-tier data storage system. Further, a Hard Disk Drive (HDD) may be an example media used in a slower or as a third tier in a multi-tier data storage system. Flash memory or Solid-State Drives (SSDs) may be an example media used in a medium or as a second tier in a multi-tier data storage system. Tiers using slower media have cost advantages and may be used to store the less frequency used (coldest or least hot) data.

As described, the middle or second tier media may include one or more SSDs which may also be known as flash media or flash storage. The second tier media or SSD may be expected to exhibit access times that are predictable and relatively fast with respect to third tier media, and should be capable of multiple device cycle writes per day (e.g., Tera-Bytes Written (TBW)). While a three-tier system is described herein, a multi-tier data storage system may include a greater or fewer number of tiers.

An SSD is page/block-based storage media where re-writing data on a block first requires the block to be erased. Further, different types of data may be written to the SSD and the data may be of different sizes. Accordingly, the cumulative data stored in the SSD media may be fragmented across the device. Generally, greater fragmentation occurs when "random" data workloads are saved as opposed to during sequential data workloads. Accordingly, an increased fragmentation on and SSD results in increased access times and a shortened lifespan of the device. Therefore, the methods and systems described herein provide a host-assisted scheme to reduce fragmentation in an SSD in a multi-tier data storage system. A reduction in fragmentation results in an improvement in access times associated with the SSD and improves the longevity of the SSD.

The methods and system described herein reduce SSD fragmentation by generating a weighted flash fragmentation factor (WFFF), where the weighted flash fragmentation factor indicates a severity of fragmentation in a non-volatile storage, such as an SSD media or memory. The severity of the fragmentation is determined based on a proposed change from a logical block address (LBA) range to a logical-to-physical (L2P) mapping table for data from a host device to be stored in the storage device media of the tiered data storage system. The data storage device may then share the weighted flash fragmentation factor with the host device for use by the host device in a tier selection of the data. The data storage device then receives the data based on the tier selection for the data from the host device. The data storage device then stores the data according to the tier selection in the tiered data storage system.

Further, the host device may move data from other tier media to reduce fragmentation in the data storage device. For example, the host device may move data from the second tier media/memory (e.g., SSD) to either the first tier media/memory (e.g., RAM) or the third tier media/memory (e.g., HDD).

In one or more aspects, the data storage device maintains L2P mapping tables and host data. The L2P mapping tables map the host's logical block addresses (LBAs) to the pages within the SSD. Workflows (loads) generated by the host device for the SSD include LBA range. The LBA range may be used by the storage device to determine a severity of impact to the performance of the solid-state storage device (SSD) based upon resulting fragmentation from the LBA range.

Generally, incoming data to a storage device may cause fragmentation or further fragmentation in the data storage device to the current or a previously written LBA. Accordingly, subsequent read access of the data storage device would result in more SSD operations to retrieve the data since pages of data would be spread across more blocks because of fragmentation. Further, the fragmentation also results in the generation of more entries in the L2P mapping table, which is not the case with respect to sequentially stored data that allows for the L2P mapping table entries to be compressed. These factors result in increased access times causing delays and write amplification.

In one aspect, an SSD data storage device generates and maintains information about how incoming LBA ranges could impact the access time and write amplification. The information may be used by the host device to determine tier selection for the data. Since some LBA ranges will more severely impact fragmentation in the SSD data storage device than other LBA ranges, a relative severity score is defined as the WFFF.

The WFFF indicates a severity of fragmentation in a non-volatile storage based on an impact of an LBA range on an L2P mapping table for data from a host device to be stored in the tiered data storage system. In one example, the WFFF may be represented on a scale from 1 to 10, where 10 could mean an incoming LBA range would be very bad both with regard to fragmentation and access time. In one example, the WFFF may be represented by the equation:

$$WFFF = Fn(\text{Read Time impact on previously written LBAs after writing incoming LBA range}, L2P \text{ mapping table entries overhead to Current and existing LBA ranges}).$$

In one aspect, WFFF considers a current system state and is function of (1) the LBA causing fragmentation to either the current LBA range or to the already existing LBA, and (2) an increase in L2P mapping table entries required for the LBA range resulting in an overall impact to the performance of the SSD data storage device.

The SSD data storage device can compute WFFF for all device ranges. In one example when the SSD data storage device is initially empty, the WFFF could be set to a "1" for all the LBA ranges. As the SSD data storage device starts getting full, the WFFF would be calculated and updated dynamically. It should be noted the granularity of WFFF can be fine-tuned with the manner in which the host device is using the SSD data storage device.

In one example, the SSD data storage device may compute the WFFF for all device LBA ranges. Accordingly, when the SSD data storage device is initially empty, the WFFF may be, for example, a "1" for all the LBA ranges. In other examples, as the SSD data storage device begins getting full, the WFFF could be calculated and updated dynamically. It should be noted the granularity of WFFF can be fine-tuned with the manner in which host device is using the SSD data storage device.

In one example, the WFFF could be shared with the host device. In one example, the mechanism for sharing the WFFF with the host device includes using a host managed buffer (HMB). In another example, the mechanism for sharing the WFFF with the host device includes using a controller memory buffer (CMB). Further examples are also contemplated for sharing the WFFF with the host device.

In one example the WFFF may also be calculated at run time when the host device wants to write data to the SSD data storage device. Accordingly, the host device may send a command to the SSD data storage device querying for a WFFF corresponding to specific LBA ranges. The SSD data storage device could also act on this command and calculate a WFFF and send response back to the host device. Other techniques for sharing the WFFF with the host are also contemplated.

Conventional tier selection was generally based on only the "hotness" of the data, with "warm" data being stored in the SSD data storage device, regardless of the impact to the performance of the SSD data storage device. In the present aspects, the tier selection for data may be represented by the equation:

$$\text{Tier Selection} = Fn(\text{Hotness of Incoming Data}, WFFF).$$

In one aspect, the host fetches the WFFF for a given LBA range. In one example, the WFFF is used by the host device to determine a tier selection for the data. In one example, even if the data is "warm" and would appropriately be located in the SSD data storage device media, if the WFFF is high (e.g., severe impact to fragmentation), then the host device could generate a tier selection different than the SSD data storage device media. Accordingly, the WFFF is an additional factor which the host device may consider in addition to the "hotness" of the data.

In one example, if the data is "warm" and the WFFF is very high, the host device may consider a tier selection of a first tier (tier 1) that includes RAM media, for example, for hotter data. In another example, if the data is "warm" and the WFFF is low, the host may consider a tier selection of a second tier (tier 2) that includes the SSD media. In another example, if the data is "warm" and the WFFF is medium high, the host may query for space availability in the first tier (tier 1) and generate a tier selection for the first tier (tier 1) or alternatively generate a tier selection for the second tier (tier 2) and route the data accordingly.

In one aspect, relocation operations may be performed. In data storage systems, relocation operations may need to be performed to relocate data due to deterioration of device health, data invalidation by a host, or fragmentation. In one example, when a data storage device identifies an LBA range that is currently not present in the device, the data storage device may make a request to the host to determine if the data associated with the missing LBA range may be relocated to the SSD data storage device resulting in less fragmentation or L2P mapping table compression.

When a host device receives a data request from a data storage device, the host determines if the data request can be honored. If the requested LBA range is still valid and is neither too hot nor too cold, the host device may accept the request and move (copy) the data to the SSD media. In case the data request is honored by the host device, the data storage device could use an incoming LBA range to defragment the device. If the request was not accepted by the host device, depending on urgency of relocation, data storage device may either (i) delay current relocation operation and try to select a different relocation source and repeat the process of contacting the host device for data, or (ii) continue with the current relocation.

In one or more embodiments, the SSD data storage device may negotiate to move data out of the SSD storage device to another tier. During a relocation operation, there could be a specific LBA range which, if moved out of SSD data storage device, would improve overall performance of SSD data storage device. In these examples, a data storage device would send a request to the host device to move the data associated with the LBA.

The above aspects and examples provide for defragmentation of the SSD data storage device and reduce the entries in the L2P mapping table. Accordingly, the access times for programming and reading SSD media may be reduced and the performance of the SSD data storage device may be improved.

FIG. 1 illustrates an embodiment of a tiered data storage system 100 that includes a host device 102 (e.g., a host computer) and an SSD data storage device 104 coupled to the host device 102. The host device 102 provides commands to the SSD data storage device 104 for transferring data between the host device 102 and the SSD data storage device 104. For example, the host device 102 may provide a write command to the SSD data storage device 104 for writing data to the SSD data storage device 104 or read command to the SSD data storage device 104 for reading data from the SSD data storage device 104. The host device 102 may be any system or device having a need for data storage or retrieval and a compatible interface for communicating with the SSD data storage device 104. For example, the host device 102 may be a computing device, a personal computer, a portable computer, or workstation, a server, a personal digital assistant, a digital camera, a digital phone, or the like.

The SSD data storage device 104 includes a host interface 106, a controller 108, an optional memory 110, and a non-volatile memory medium tier media/memory 117. The host interface 106 is coupled to the controller 108 and facilitates communication between the host device 102 and the controller 108. Additionally, the controller 108 is coupled to the memory 110 and the non-volatile memory 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an Institute of Electrical and Electronic Engineers (IEEE) 1394 (Firewire) interface, or the like.

In some embodiments, the host device 102 includes the SSD data storage device 104 (e.g., the host device 102 and the SSD data storage device 104 are implemented as a single component). In other embodiments, the SSD data storage device 104 is remote with respect to the host device 102 or is contained in a remote computing system coupled in communication with the host device 102. For example, the host device 102 may communicate with the SSD data storage device 104 through a wireless communication link.

The controller 108 controls operation of the SSD data storage device 104. In various embodiments, the controller 108 receives commands from the host device 102 through the host interface 106 and performs the commands to transfer data between the host device 102 and the medium tiers (SSD) media/memory 117. The controller 108 may include any type of processing device, such as a microprocessor, a microcontroller, an embedded controller, a logic circuit, software, firmware, or the like, for controlling operation of the SSD data storage device 104.

In some embodiments, some or all of the functions described herein as being performed by the controller 108 may instead be performed by another element of the SSD data storage device 104. For example, the SSD data storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host device 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host device 102 and the non-volatile memory 112. For example, the memory 110 or a portion of the memory 110 may be a cache memory.

The controller 108 and/or the non-volatile memory 112 can be configured to manage multi-tier memory as described herein. For example, as shown in FIG. 1, the controller 108 includes a multi-tier memory mapping module 114 for managing accesses of a fast (e.g., "first") tier media/memory 116, a medium (e.g., "second") tier media/memory 117, and a slow (e.g., "third") tier media/memory 118 of the non-volatile memory 112. Other embodiments may include a different number of tiers of memory and/or different types of memory for the different tiers. Further, the fast tier memory 116 and the slow tier memory 118 may be logically located outside of the SSD data storage device 104.

In response to a write issued by the host device 102, the multi-tier memory mapping module 114 may initially write data to one of the tiers as specified by a tier selection identified by a tier selection module 103 in the host device 102. The tier selection may specify one of a block of the fast tier memory 116, medium tier memory 117, or slow tier memory 118. The controller 108 may thereafter copy or move the data to other tier memories.

In conjunction with copying the data to one of the tiers of memory, the multi-tier memory mapping module 114 configures an L2P mapping table 122 to enable a subsequent access 124 of the data in the one of the tiers of memory that includes the data. In accordance with the aspects herein, the multi-tier memory mapping module 114 receives a tier selection for data from the host device 102 and stores the data in the designated tier of memory and updates the L2P mapping table 122.

In accordance with the aspects herein, the SSD data storage device 104 further includes a fragmentation manager 126 configured to generate a WFFF 127A. The fragmentation manager 126 is configured to generate a weighted flash fragmentation factor 127A, where the weighted flash fragmentation factor 127A indicates a severity of fragmentation in the non-volatile storage media based on the LBA range of data from a host to be stored. In one example, the fragmentation may be with respect to fragmentation in the second tier media/memory (e.g., SSD media/memory) 117.

The fragmentation manager is further configured to share the weighted flash fragmentation factor 127A with the host device 102 for use by the host device 102 in a tier selection of the data. The tier selection is performed by the tier selection module 103 in the host device 102. Further, the host device 102 may store the shared weighted flash fragmentation factor as weighted flash fragmentation factor 127B in the host device 102. The shared weighted flash fragmentation factor 127B may be used by the tier selection module 103 to determine a tier selection for the data and for any relocation of the data between tiers of memories.

The fragmentation manager 126 may be further configured to receive the data and the tier selection for the data from the host device 102 and, in conjunction with the multi-tier memory mapping module 114, store the data in the non-volatile storage media according to the tier selection in the tiered data storage system.

In some examples, the fragmentation manager 126 is further configured to generate the weighted flash fragmentation factor based on an impact to the access time of previously stored data in the tiered data storage system. In some examples, the fragmentation manager 126 is further configured to generate the weighted flash fragmentation factor based on overhead created in the L2P mapping table based on the LBA range of the data. In other examples, the fragmentation manager 126 is further configured to generate the weighted flash fragmentation factor for each LBA range in the data storage device.

In other examples, the fragmentation manager 126 is further configured to share the weighted flash fragmentation factor to the host device comprises sharing a weighted flash fragmentation factor for each LBA range in the data storage device in one of a host managed buffer (HMB) and a controller memory buffer (CMB). In other examples, the fragmentation manager 126 may be further configured to generate the weighted flash fragmentation factor in response to receiving a request to calculate the weighted flash fragmentation factor for an LBA of data. In other examples, the tier selection is based on anticipated access frequency (e.g., "hotness") of the data and the weighted flash fragmentation factor.

The tiered data storage system 100 further includes at least a first tier media/memory 116 of, for example, random access memory (RAM) memory devices, a second tier media/memory 117 of solid state device (SSD) memory devices, and a third tier media/memory 118 of hard disk drive (HDD) memory devices. The different tiers of media/memory are configured to have different access times.

The tiered data storage system 100 further includes a relocation module 128 configured to identify an LBA range of a fragment of data that is included in another range of logical block addresses, and request the fragment of data be moved to tier different than the second tier.

For purposes of illustration, the L2P mapping table 122, the fragmentation manager 126, and the relocation module 128 are depicted in FIG. 1 as being separate from (e.g., external to) the multi-tier memory mapping module 114. In different embodiments, some or all of this information may be stored in the multi-tier memory mapping module 114, a memory external to the multi-tier memory mapping module 114, a memory external to the controller 108 (e.g., the memory 110), or any combination thereof.

Figure 2:
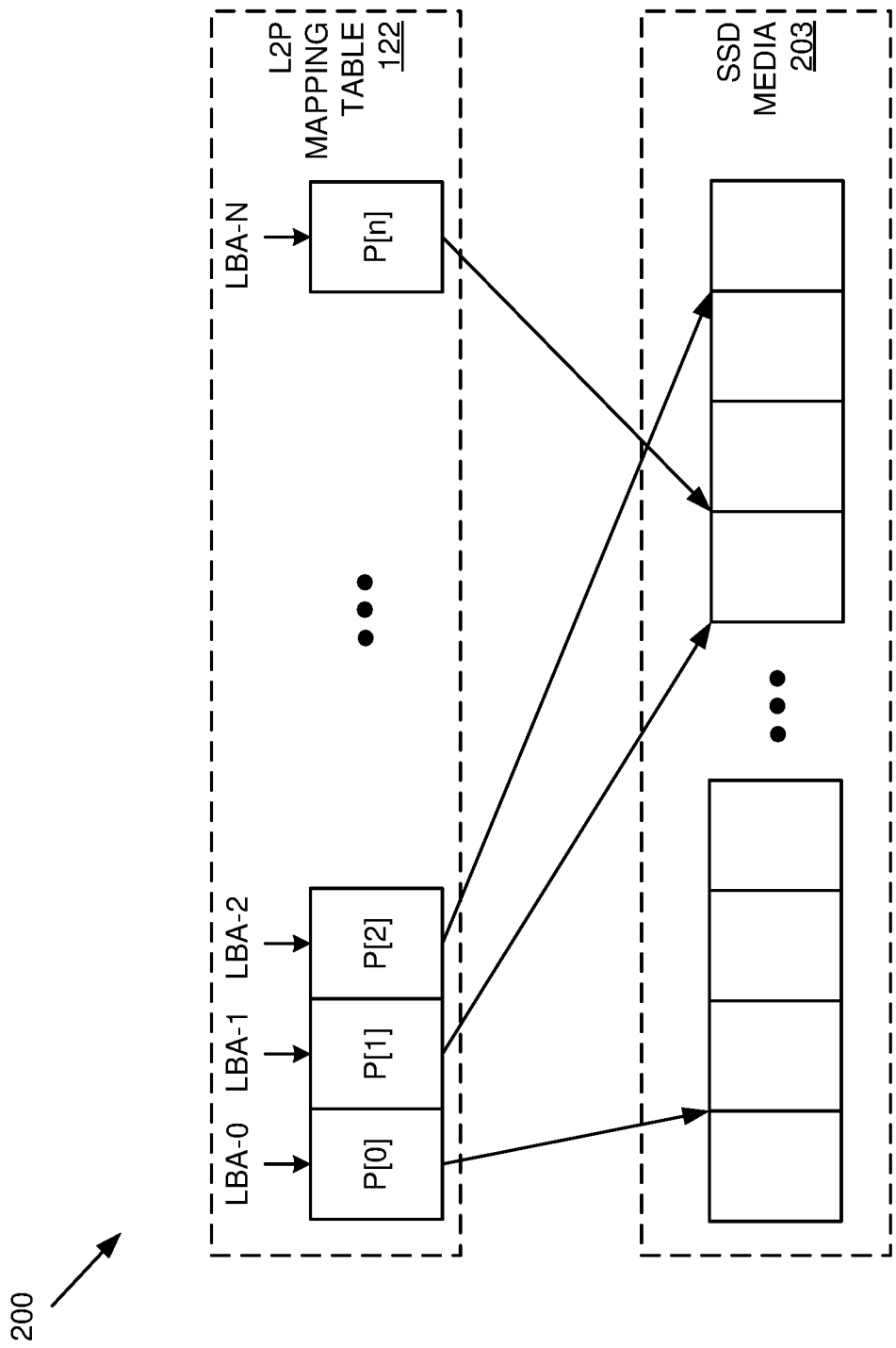
FIG. 2 illustrates an example memory mapping scheme in accordance with one or more aspects of the disclosure.

FIG. 2 illustrates an embodiment of a memory mapping structure 200 for an L2P mapping table 122. As shown in memory mapping structure 200, an array "P" includes, for example, entries or records from "0" to "n", where "n" is the maximum logical block in a logical block array (LBA). Each entry in the logical block array (LBA) "P" maps to a specific physical page in an SSD media/memory 203, for example, by an index or pointer value. In operation, the host device 102 may send a request to the SSD data storage device 104 to retrieve data from the SSD media/memory 203 that is indexed by the L2P mapping table 122.

In one or more aspects, the data storage device maintains L2P mapping tables and host data. The L2P mapping tables map the host's logical block addresses (LBAs) to the pages within the SSD. Workflows (loads) generated by the host for the SSD include LBA range. The LBA range may be used by the storage device to determine a severity of impact to the performance of the storage device (SSD) based upon resulting fragmentation from the LBA range.

Generally, incoming data to a storage device may cause fragmentation or further fragmentation in the data storage device to the current or a previously written LBA. Accordingly, subsequent read access of the data storage device would result in more SSD operations to retrieve the data since pages of data would be spread across more blocks because of fragmentation. Further, the fragmentation also results in the generation of more entries in the L2P mapping table, which is not the case with respect to sequentially stored data that allows for the L2P mapping table entries to be compressed. These factors result in increased access times causing delays and write amplification.

In one aspect, an SSD data storage device maintains information about how incoming LBA ranges could impact the access time and write amplification. The information may be used by the host to determine tier selection for the data. Since some LBA ranges will more severely impact fragmentation in the SSD data storage device than other LBA ranges, a relative severity score is defined as a WFFF. The WFFF indicates a severity of fragmentation in a non-volatile storage based on an LBA range in an L2P mapping table for data from a host to be stored in the tiered data storage system.

The WFFF may be a function of a change in a quantity of sensing operations necessary for the data storage device to retrieve the data. However, sensing operations that may be performed in parallel (concurrently) are weighted less than sensing operations that must be performed in series. The scenarios in FIGS. 3A-3C illustrate the different scenarios that are differently weighted.

Figure 4A:
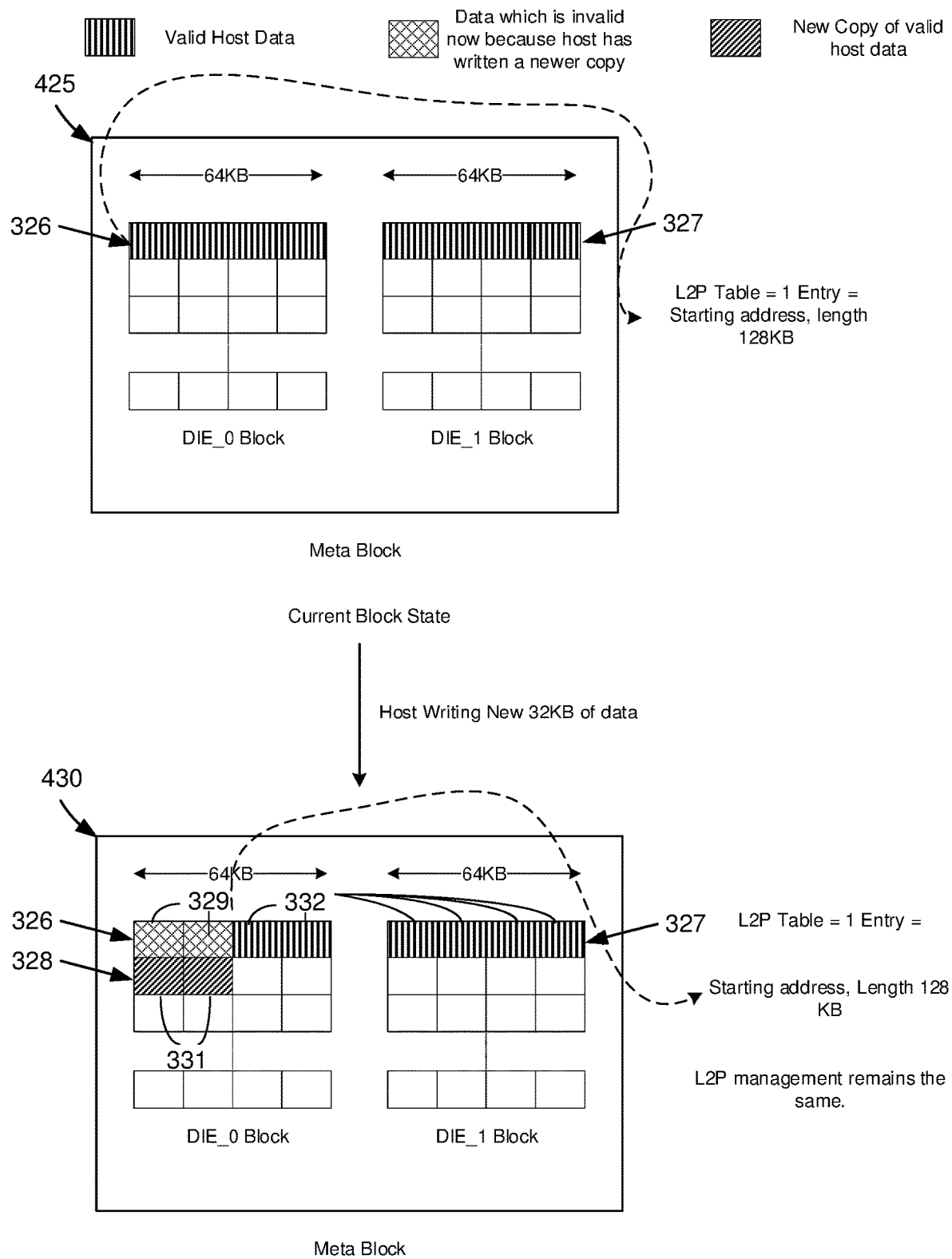
FIGS. 4A-4B illustrate data storage scenarios that impact a data storage device performance based on a quantity of entries in a logical-to-physical mapping of prospectively stored data.
Figure 4B:
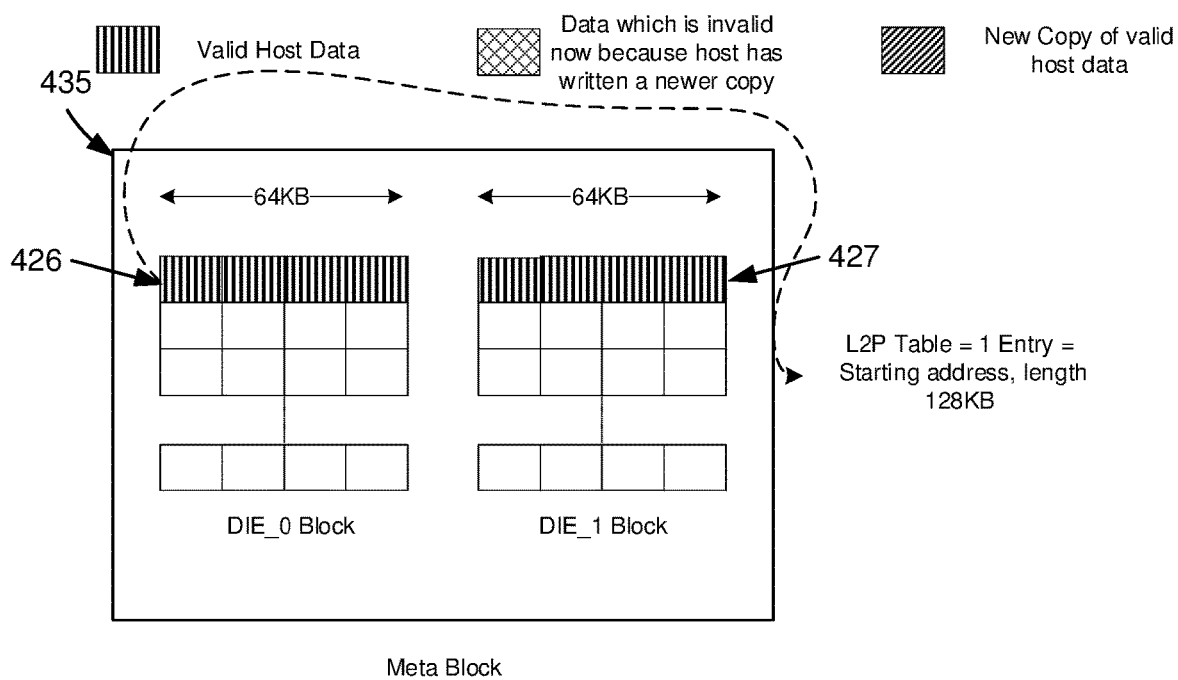
Figure 4B:
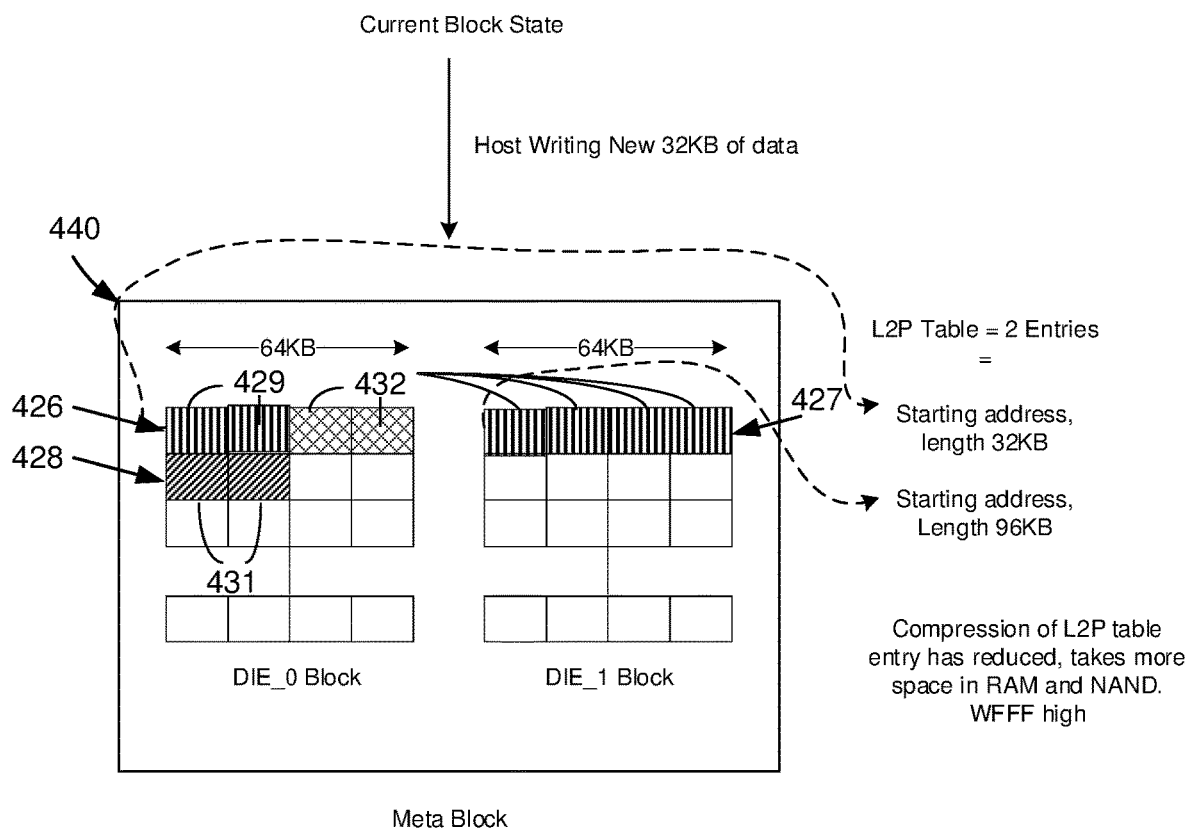

The WFFF may also be a function of a change in the quantity of entries in a logical-to-physical mapping table, which affects the size and access time of the data storage device. The scenarios in FIG. 4A-4B illustrate the different scenarios where a prospective data storage operation on the data storage device results in a differently weighted WFFF.

Figure 3A:
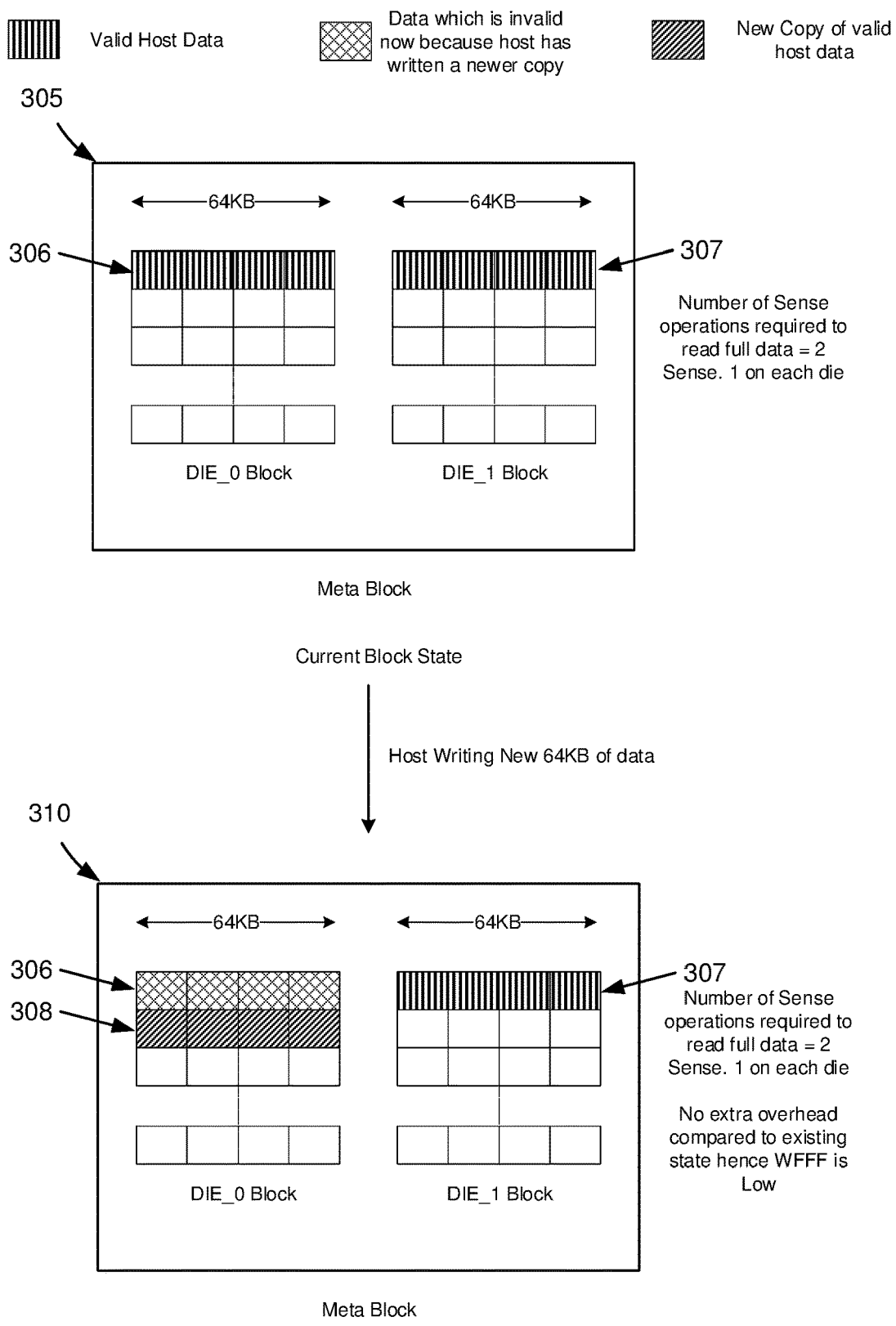
FIGS. 3A-3C illustrate data storage scenarios that impact a data storage device performance based on a quantity of sense operations required to retrieve prospectively stored data.
Figure 3B:
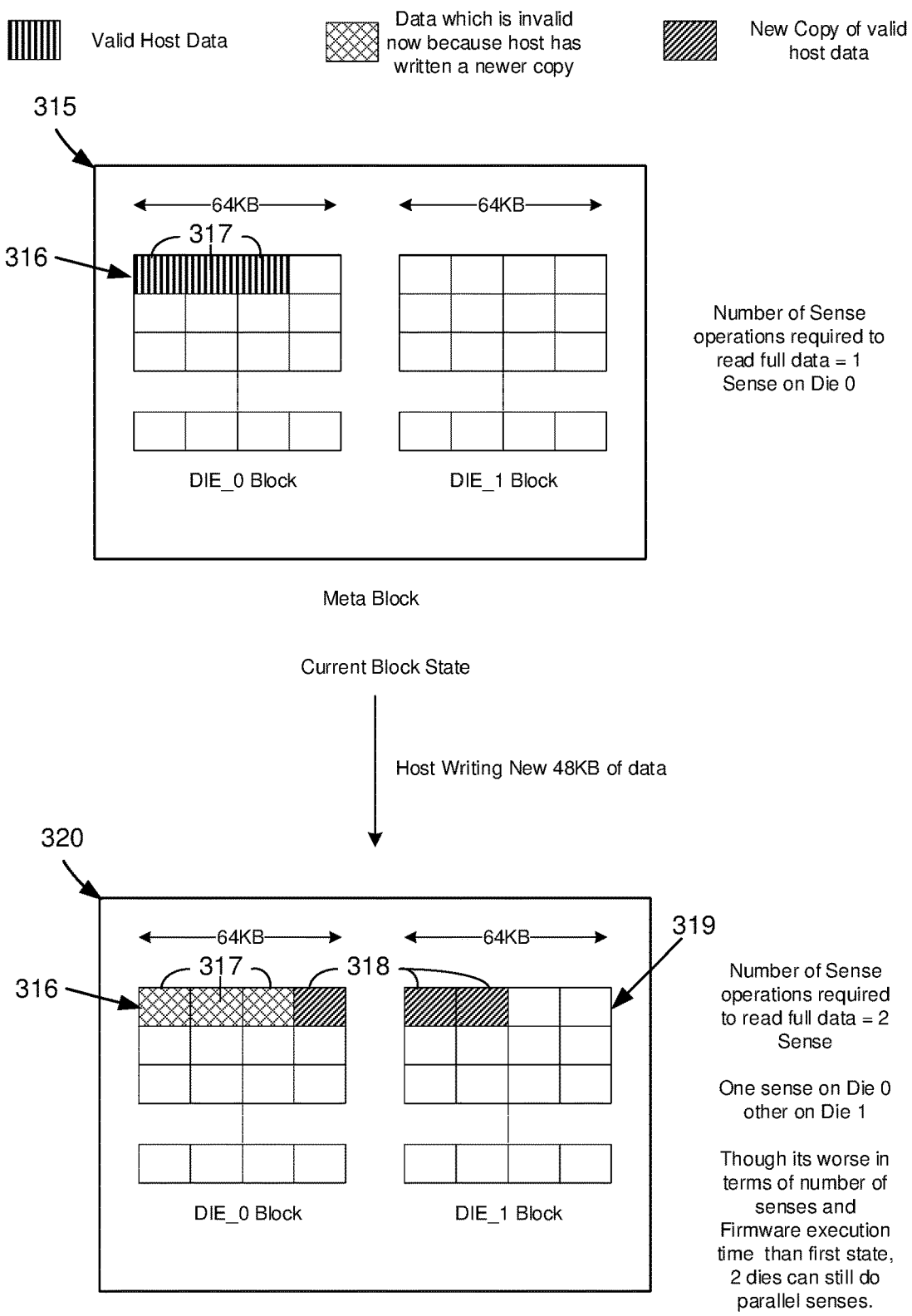
Figure 3C:
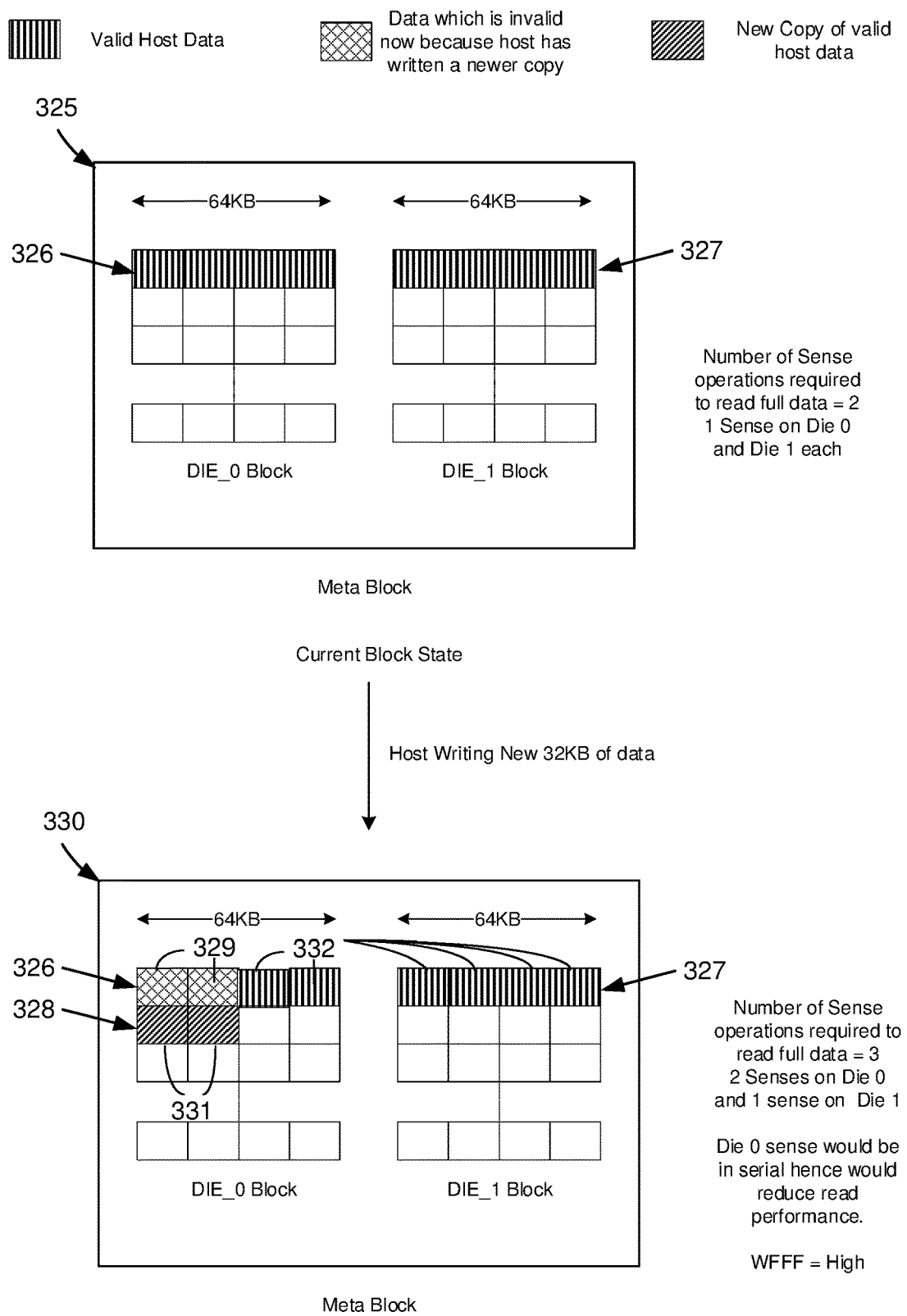

FIGS. 3A-3C illustrate various scenarios where the WFFF is differently scored. The WFFF may include an algorithm of:

$$WFFF = W1*P1 + W2*P2 + \ldots + Wn*Pn.$$

The first parameter P1 may be a difference in the quantity of sensing operations to retrieve data after the prospective data storage operation. In some examples, the first weight W1 may be implementation-specific depending on the "hotness" of the data or other factors such as the remaining lifespan of the data storage media, or the lifespan of the data storage device. In other examples, other weights may include the abundance of available storage blocks, and the availability of storage in other tiers in the multi-tier data storage system.

In other examples, a second parameter P2 may be a difference in an increase in the size of the logical-to-physical mapping table in the data storage device. In other examples, a second weight W2 may be based on the available data storage for the logical-to-physical mapping table. In other examples, the weight may be based on an ability to compress the logical-to-physical mapping table based on the prospective data storage operation. Other parameters Pi and weights Wi are also contemplated.

FIG. 3A illustrates an example scenario of a prospective data storage operation where the prospective operation would result in a WFFF that is in a "low" (e.g., 1-3 on a scale of 1-10) severity of impact category. A plot 305 illustrates a data storage configuration in a data storage device prior to an evaluation of a prospective data storage operation. In plot 305, 64 kilobyte (KB) block 306 of valid host data is illustrated as being present in a DIE_0 and 64 KB block 307 of valid host data is illustrated as being present in a DIE_1. Therefore, retrieval of the host data including block 306 and block 307 would require a sense operation in each of the die for a total of two sense operations, however, these two sense operations could be performed in parallel.

A plot 310 illustrates a data storage configuration that would result from a prospective writing of a new 64 KB block 308 of valid host data and is illustrated as being present in DIE_0. The new copy of the data would result in block 306 in plot 310 becoming invalid. Therefore, retrieval of the host data including block 307 and block 308 would require a sense operation in each of the die for a total of two sense operations, however, these two sense operations could be performed in parallel. Accordingly, the parameter for the quantity change in the calculation of the WFFF is very low and a resulting WFFF may be calculated to be very low (e.g., 1-3 on a scale of 1-10). In some examples, the calculation of the WFFF may include other parameters such as the impact to the number of entries or size of the logical-to-physical mapping table.

FIG. 3B illustrates an example scenario of a prospective data storage operation where the prospective operation would result in a WFFF that is in a "medium" (e.g., 4-6 on a scale of 1-10) severity of impact category. A plot 315 illustrates a data storage configuration in a data storage device prior to an evaluation of a prospective data storage operation. In plot 315, three 16 KB pages 317 are written (programmed) into a 64 KB block 316 of valid host data is illustrated as being present in a DIE_0. Therefore, retrieval of the host data including pages 317 in block 316 would require a sense operation in the DIE_0 for a total of one sense operation.

A plot 320 illustrates a data storage configuration that would result from a prospective writing of a new 48 KB data into pages 318 with one page 318 being written to block 316 and two pages 318 being written to block 319. The new copy of the data would result in pages 317 in block 316 in plot 320 becoming invalid. Therefore, retrieval of the host data including pages 318 from block 316 and block 319 would require a sense operation in each of the die for a total of two sense operations, however, these two sense operations could be performed in parallel, so the impact of doubling the quantity of sense operations may be mitigated. Accordingly, the parameter for the quantity change in the calculation of the WFFF is moderate or "medium" and a resulting WFFF may be calculated to be moderate or medium (e.g., 4-6 on a scale of 1-10). In some examples, the calculation of the WFFF may include other parameters such as the impact to the number of entries or size of the logical-to-physical mapping table.

FIG. 3C illustrates an example scenario of a prospective data storage operation where the prospective operation would result in a WFFF that is in a "high" (e.g., 7-10 on a scale of 1-10) severity of impact category. A plot 325 illustrates a data storage configuration in a data storage device prior to an evaluation of a prospective data storage operation. In plot 305, 64 KB block 306 of valid host data is illustrated as being present in a DIE_0 and 64 KB block 307 of valid host data is illustrated as being present in a DIE_1. Therefore, retrieval of the host data including block 306 and block 307 would require a sense operation in each of the die for a total of two sense operations, however, these two sense operations could be performed in parallel.

A plot 330 illustrates a data storage configuration that would result from a prospective writing of a new 32 KB data into pages 331 of block 328. The new copy of the data would result in pages 329 in block 326 in plot 330 becoming invalid. Therefore, retrieval of the host data including pages 332 from block 326 and block 327, and pages 331 from block 328 would require two sense operations for pages 332 in block 326 and block 327, and a third sense operation for pages 331 in block 328. While the sense operations for pages 332 in block 326 and block 327 may be performed in parallel, the sense operation for pages 331 in block 328 must be performed serially. Accordingly, the parameter for the quantity change in the calculation of the WFFF is "high" and a resulting WFFF may be calculated to be high (e.g., 7-10 on a scale of 1-10). In some examples, the calculation of the WFFF may include other parameters such as the impact to the number of entries or size of the logical-to-physical mapping table.

FIG. 4A illustrates an example scenario of a prospective data storage operation where impact to the logical-to-physical mapping table may be considered as a parameter in the generation of the WFFF. Plot 425 and plot 430 illustrate the changes to the logical-to-physical mapping table for the prospective data operation illustrated in the scenario of FIG. 3C. In plot 425, the logical-to-physical mapping table only requires a single table entry because the pages for the host data are continuous. Accordingly, the single entry in the logical-to-physical mapping table may include a starting address and a length (e.g., 128 KB).

A plot 430 illustrates a data storage configuration that would result from a prospective writing of new 32 KB data into pages 331 of block 328. The new copy of the data would result in pages 329 in block 326 becoming invalid. Since the pages 332 and pages 331 are consecutive, the range may be identified by a single entry in a logical-to-physical mapping table. Accordingly, the parameter for the quantity change in the logical-to-physical mapping table calculation of the WFFF is "low" and, in one example, this nominal impact to the changes in a quantity of entries to logical-to-physical mapping table may be added to the parameters associated with the changes to the changes to the quantity of sensing operations resulting from the prospective data storage operation at the data storage device.

FIG. 4B illustrates an example scenario of a prospective data storage operation where impact to the logical-to-physical mapping table may be considered as a parameter in the generation of the WFFF. Plot 435 and plot 440 illustrate the changes to the logical-to-physical mapping table for a prospective data operation. In plot 435, the logical-to-physical mapping table only requires a single table entry because the pages for the host data for block 426 and block 427 are continuous. Accordingly, the single entry in the logical-to-physical mapping table may include a starting address and a length (e.g., 128 KB).

A plot 440 illustrates a data storage configuration that would result from a prospective writing of new 32 KB data into pages 431 of block 428. The new copy of the data would result in pages 432 in block 426 becoming invalid. Since the pages 429 and pages 431 are not consecutive, the range may be identified by two entries in a logical-to-physical mapping table. The additional entries in the logical-to-physical mapping table require additional memory resources and may require additional computational resources for retrieving the host data. Accordingly, the parameter for the quantity change in the logical-to-physical mapping table calculation of the WFFF is "high" and, in one example, this impact to the changes in a quantity of entries to logical-to-physical mapping table may be added to the parameters associated with the changes to the changes to the quantity of sensing operations resulting from the prospective data storage operation at the data storage device.

Figure 5:
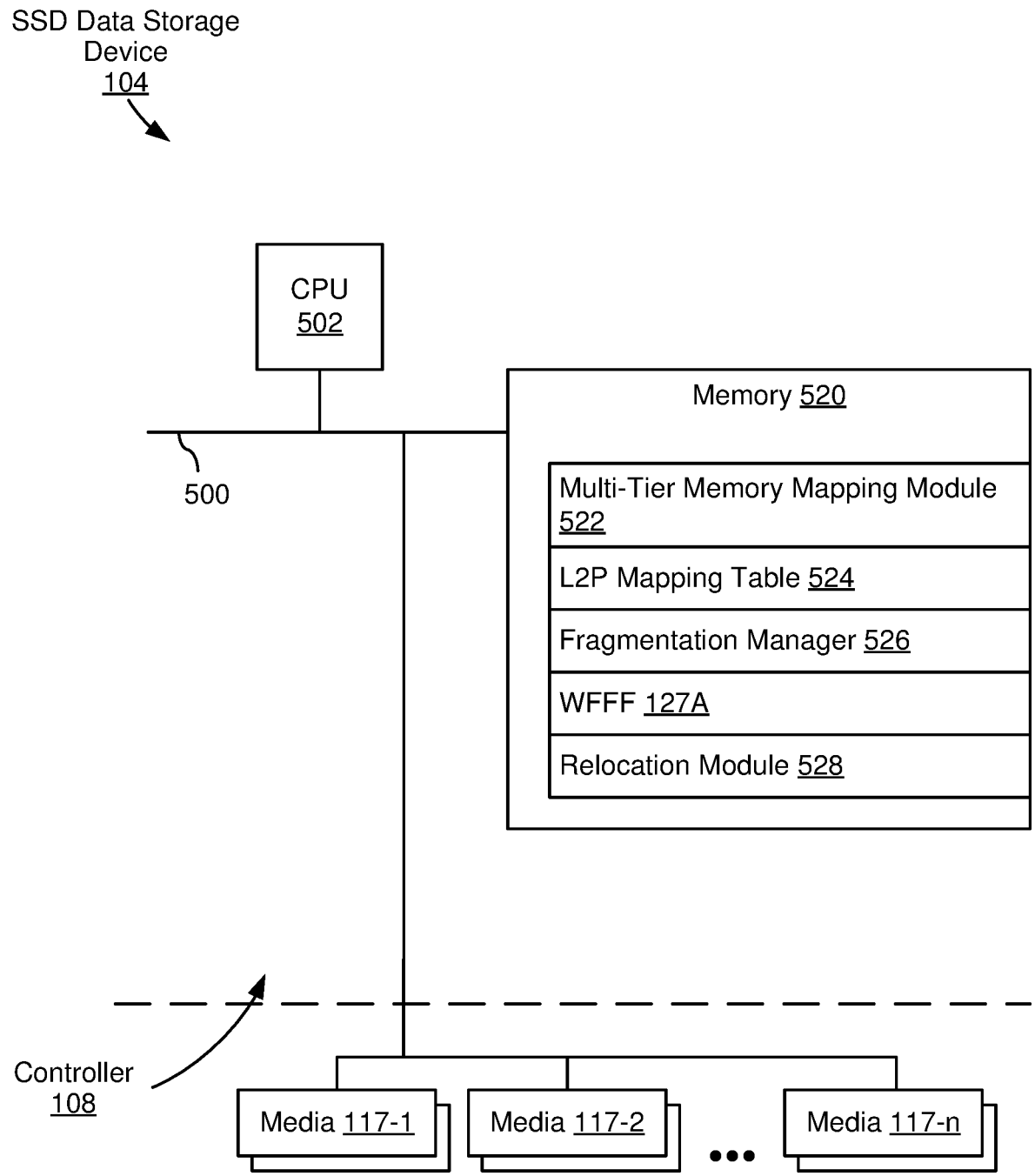
FIG. 5 schematically illustrates an example implementation of a storage device of the tiered storage system in accordance with one or more aspects of the disclosure.

FIG. 5 is a block diagram illustrating tier management handled by SSD data storage device 104, in accordance with some embodiments. SSD data storage device 104 includes a central processing unit (CPU) 502 for executing modules, programs, and/or instructions stored in memory 520 and thereby performing processing operations, memory 520 (sometimes called controller memory, device controller memory, or operating memory), and one or more communication buses 500 for interconnecting these components.

The one or more communication buses 500 optionally include circuitry (sometimes called a chipset) that interconnects and controls communications between system components. CPU 502 and memory 520 may be coupled to media interface 508, media/memory 117, and any additional module(s) by the one or more communication buses 300. In some embodiments, interface hardware and/or protocols for providing communication through communication buses 500 may also be present for communication with any given component.

Memory 520 may include high-speed random-access memory, such as DRAM, SRAM, Double Dynamic Rate (DDR) RAM, or other random-access solid-state memory devices, and may include non-volatile memory, such as one or more magnetic disk storage devices, optical disk storage devices, flash memory devices, or other non-volatile solid state storage devices. Memory 520 may optionally include one or more storage devices remotely located from CPU 502.

Memory 520 comprises a non-transitory computer readable storage medium. In some embodiments, memory 520, or the non-transitory computer readable storage medium of memory 520 stores the following programs, modules, and data structures, or a subset or superset thereof:

A multi-tier memory mapping module 522 organizes tier configurations in conjunction with peer storage devices and/or commands from other systems or subsystems and for the generation and management of the L2P mapping table 524. The multi-tier mapping module for identify a gap in logical block addresses in the L2P mapping table in the second tier, identify an LBA range of a fragment of data that is included in another range of logical block addresses, and request the fragment of data be moved to a tier different than the second tier. The multi-tier memory mapping module may further provide a means for receiving the data and the tier selection for the data from the host device, and a means for storing the data according to the tier selection in the tiered data storage system. For example, the multi-tier mapping module may include a host interface for receiving host storage commands from the host device in accordance with a host storage protocol and a storage manager for executing storage operations to non-volatile media/memory 117.

An L2P mapping table 524 maps the logical blocks known to the host device to the physical blocks in SSD media, as illustrated with respect to FIG. 2.

A fragmentation manager 526 generates a weighted flash fragmentation factor, where the weighted flash fragmentation factor indicates a severity of fragmentation in the non-volatile storage media based on the LBA range of data from a host device to be stored. The fragmentation manager is further configured for sharing the weighted flash fragmentation factor with the host device for use by the host device in a tier selection of the data. The fragmentation manager is further configured for receiving the data and the tier selection for the data from the host device and for storing the data in the non-volatile storage media in the tiered data storage system according to the tier selection. The fragmentation manager may generate a WFFF based on an impact to access time of previously stored data in the tiered data storage system. The fragmentation manager may generate the WFFF based on overhead created in an L2P mapping table based on the LBA range of the data. The fragmentation manager may generate the weighted flash fragmentation factor for each LBA range in the data storage device.

The fragmentation manager may share the weighted flash fragmentation factor with the host device. The fragmentation manager may share the weighted flash fragmentation factor for each LBA range in the data storage device in one of a host managed buffer (HMB) and a controller memory buffer (CMB). Other communication mechanisms are also contemplated for sharing the weighted flash fragmentation factor with the host device. The fragmentation manager may further provide a means for generating a weighted flash fragmentation factor, where the weighted flash fragmentation factor indicates a severity of fragmentation in a non-volatile storage based on an LBA range of data from a host device to be stored, and a means for sharing the weighted flash fragmentation factor to the host device for use by the host device in a tier selection of the data. For example, the means for generating the WFFF may include corresponding functions, parameters, and/or data structures configured in executable instructions stored in memory 520 for execution by CPU 502, such as instructions embodying method 700 in FIG. 7. The means for sharing the WFFF may include functions, parameters, and/or data structures in executable instructions stored in memory 520 for execution by CPU 502, such as instructions for storing WFFF values to the HMB and/or CMB and/or otherwise sending a notification of the WFFF values to the host device.

A WFFF 127A indicates a severity of fragmentation in the non-volatile storage media based on the LBA range of data from a host device to be stored.

A relocation module 528 is configured to relocate data due to deterioration of device health, data invalidation by a host, or fragmentation, for example, when a data storage device identifies an LBA range that is currently not present in the device. The relocation module may be configured to request the host determine if the data associated with the missing LBA range may be relocated to the SSD data storage device, resulting in less fragmentation or L2P mapping table compression. The relocation module may be configured to accept the request to move, and then move (copy) the data to the SSD media/memory. The relocation module may be configured to identify a gap in logical block addresses in the logical-to-physical mapping table in the data storage device, identify a logical block address range of a fragment of data that is included in another range of logical block addresses; and request the fragment of data be moved to a tier different than the data storage device.

Each of the above identified elements may be stored in one or more of the previously mentioned memory devices that together form memory 520 and corresponds to a set of instructions for performing a function described above. The above identified modules, managers, or programs (i.e., sets of instructions) need not be implemented as separate software programs, procedures or modules, and thus various subsets of these modules may be combined or otherwise re-arranged in various embodiments.

In some embodiments, memory 520 may store a subset of the modules and data structures identified above. Furthermore, memory 520 may store additional modules and data structures not described above. In some embodiments, the programs, modules, and data structures stored in memory 520, or the non-transitory computer readable storage medium of memory 520, provide instructions for implementing respective operations of the methods described below. In some embodiments, some or all of these modules may be implemented with specialized hardware circuits that subsume part or all of the module functionality.

Figure 6:
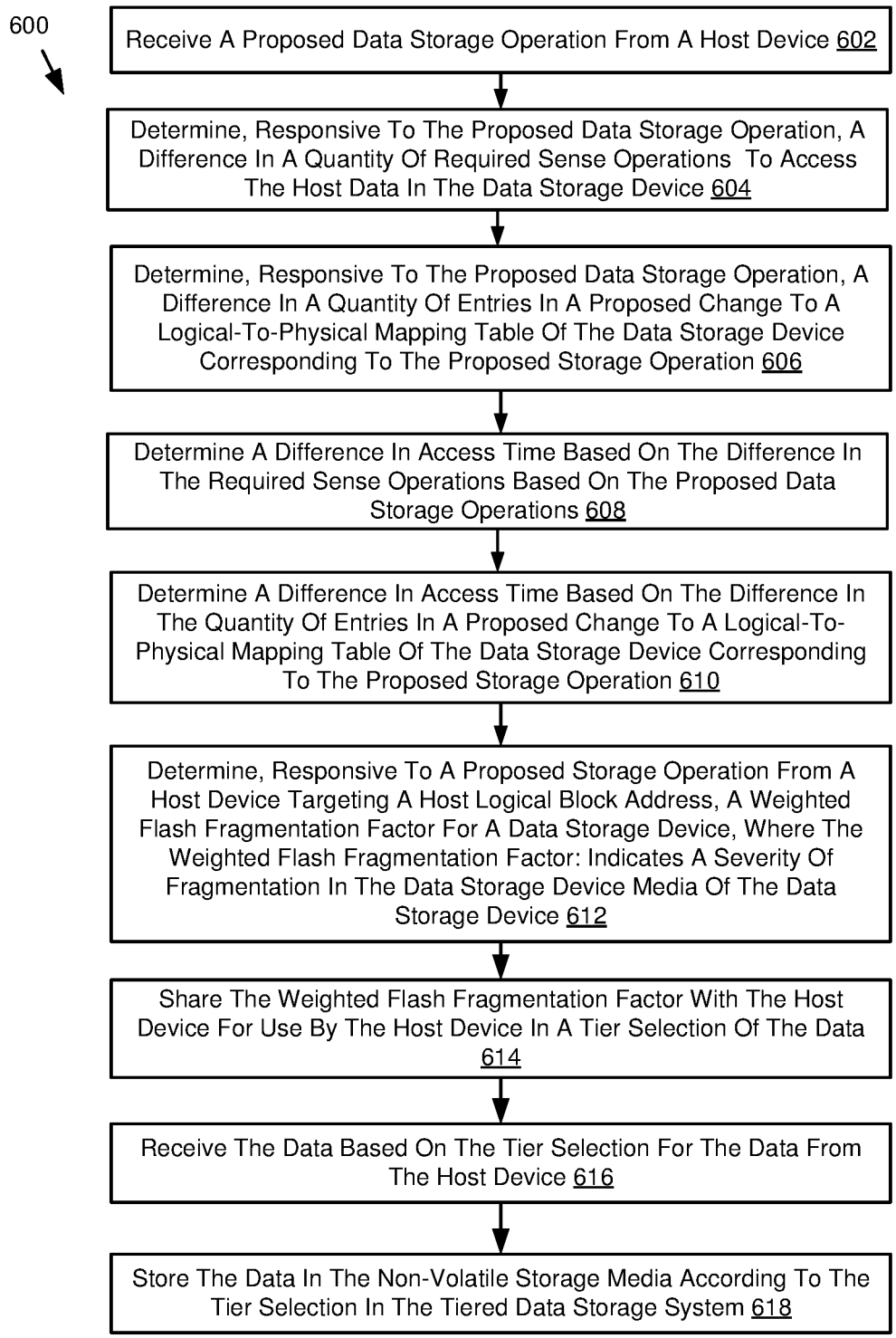
FIG. 6 illustrates an example of a method for utilizing a weighted flash fragmentation factor for determining a tier selection for storing data in a tiered data storage system.

FIG. 6 illustrates a flowchart for an example method 600 for providing a weighted flash fragmentation factor for determining a tier selection for data in a tiered data storage system.

At a block 602, a host interface 106 receives a proposed data storage operation from a host device. The proposed data storage operation may include logical block address range for the data.

At a block 604, the fragmentation manager 126 determines, responsive to the proposed data storage operation, a difference in a quantity of required sense operations to access the host data in the data storage device. The quantity of sense operations is based on the location of the pages within blocks and the location of the blocks within the storage device media, such as the die as described with reference to FIGS. 3A-3C described herein.

At a block 606, the fragmentation manager 126 and a multi-tier memory mapping module 114 determine, responsive to the proposed data storage operations, a difference in a quantity of entries in a propose change to a logical-to-physical mapping table of the data storage device corresponding to the proposed storage operations.

At a block 608, the fragmentation manager 126 determines a difference in access time based on the difference in the required sense operations based on the proposed data storage operations.

At a block 610, the fragmentation manager 126 determines a difference in access time based on the difference in the quantity of entries in a proposed change to a logical-to-physical mapping table of the data storage device corresponding to the proposed data storage operation.

At a block 612, a fragmentation manager 126 responsive to the proposed storage operation targeting a host logical block address, determines a weighted flash fragmentation factor, where the weighted flash fragmentation factor indicates a severity of fragmentation in a storage device media of the data storage device. The weighted flash fragmentation factor may be based on an impact to the access time of previously stored data in the tiered data storage system. The weighted flash fragmentation factor may be further based on overhead created in the L2P mapping table based on the LBA range of the data. The weighted flash fragmentation factor may be generated for each LBA range in the data storage device. The weighted flash fragmentation factor may be generated in response to a received request to calculate the weighted flash fragmentation factor for an LBA of data.

At a block 614, the fragmentation manager 126 shares the weighted flash fragmentation factor with the host device for use by the host device in a tier selection of the data. Sharing of the weighted flash fragmentation factor for each LBA range in the data storage device may be performed using one of a host managed buffer (HMB) and a controller memory buffer (CMB).

At a block 616, a multi-tier memory mapping module receives the data based on the tier selection for the data from the host device.

At a block 618, the multi-tier memory mapping module stores the data in the non-volatile storage media according to the tier selection in the tiered data storage system.

Figure 7:
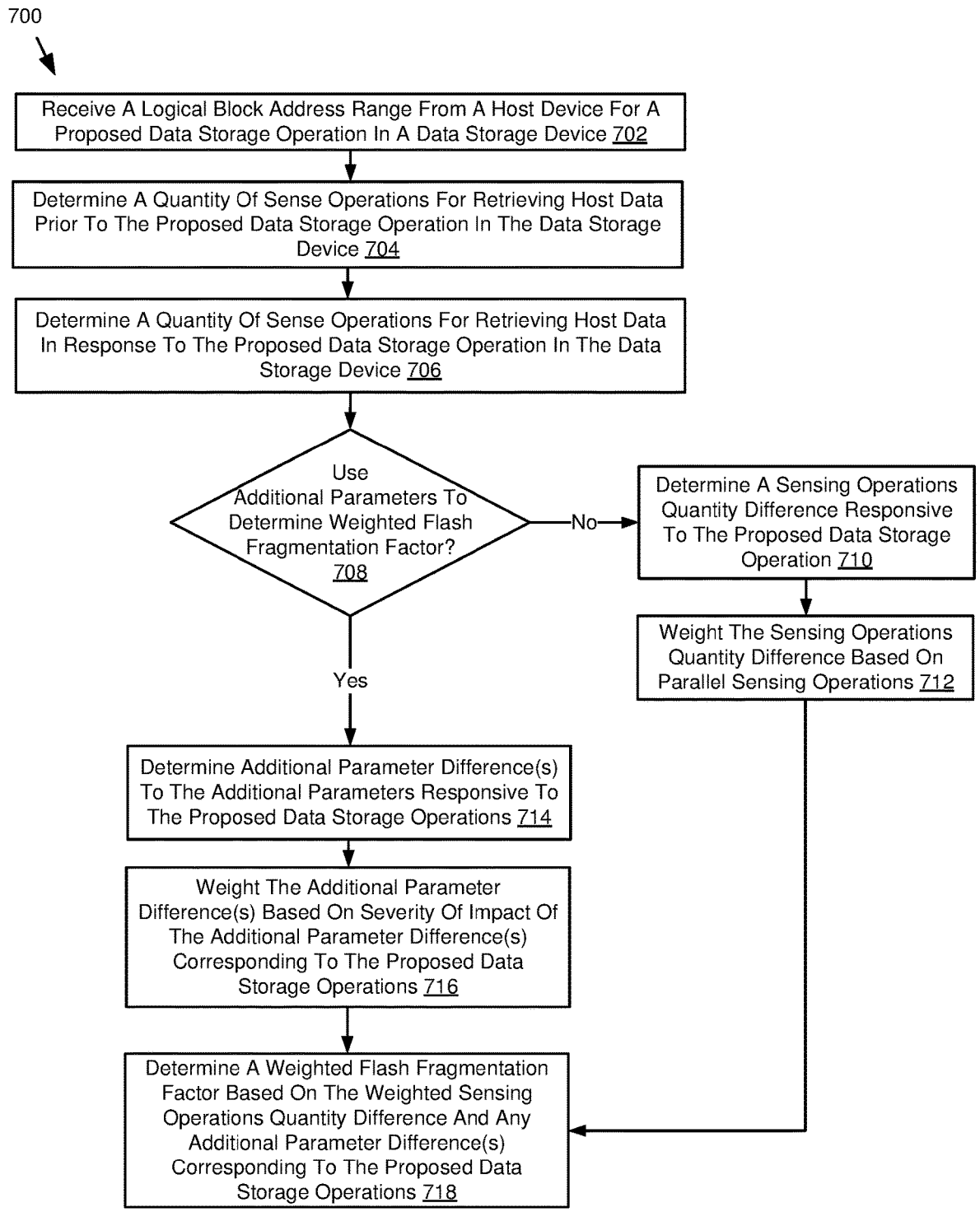
FIG. 7 illustrates an example of a method for calculating a weighted flash fragmentation factor.

FIG. 7 illustrates an example of a method for calculating a weighted flash fragmentation factor.

At a block 702, the fragmentation manager 126 receives a logical block address range from a host device for a proposed data storage operation in a data storage device.

At a block 704, the fragmentation manager 126 determines a quantity of sense operations for retrieving host data prior to the proposed data storage operation in the data storage device.

At a block 706, the fragmentation manager 126 determines a quantity of sense operations for retrieving host data in response to the proposed data storage operation in the data storage device.

At a block 708, the fragmentation manager 126 determines whether additional parameters are to be used for the determination of the weighted flash fragmentation factor. If no additional parameters are to be used, then processing passes to a block 710.

At a block 710, the fragmentation manager 126 determines a sensing operations quantity difference responsive to the proposed data storage operation when compared with the sensing operations determined in block 704.

At a block 712, any weighting of the sensing operations quantity difference is performed, such as weighting based on prospective parallel sensing operations.

At a block 714, the fragmentation manager 126 determines additional parameter difference(s) to the additional parameter responsive to the proposed data storage operations when the block 708 determines that additional parameters are to be used for the determination of the weighted flash fragmentation factor.

At a block 716, the fragmentation manager 126 weights the additional parameter difference(s) based on the severity of impact of the additional parameter difference(s) corresponding to the proposed data storage operations.

At a block 718, the fragmentation manager 126 determines a weighted flash fragmentation factor based on the weighted sensing operations quantity difference and any additional parameter difference(s) corresponding to the proposed data storage operations.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing.

Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language.

The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A method, comprising:
   determining, responsive to a proposed storage operation from a host device targeting a host logical block address, a weighted flash fragmentation factor for a data storage device, wherein the weighted flash fragmentation factor:
is a function of:
a change in a quantity of sense operations; and
a change to a number of entries in a logical-to-physical mapping table; and
indicates a severity of fragmentation in storage device media of the data storage device;
sharing the weighted flash fragmentation factor with the host device for use by the host device in a tier selection for the proposed storage operation;
receiving, responsive to the tier selection by the host device, the proposed storage operation; and
executing, by the data storage device, the proposed storage operation.

2. The method of claim 1, wherein the weighted flash fragmentation factor is based on a difference in access time of previously stored data in the data storage device.

3. The method of claim 2, wherein the difference in access time is based on the change in the quantity of sense operations to read the host logical block address in the data storage device.

4. The method of claim 2, wherein the weighted flash fragmentation factor is further based on a proposed change to the logical-to-physical mapping table of the data storage device corresponding to the proposed storage operation.

5. The method of claim 1, wherein determining the weighted flash fragmentation factor further comprises determining the weighted flash fragmentation factor for each logical block address range in the data storage device.

6. The method of claim 1, wherein sharing the weighted flash fragmentation factor with the host device comprises sharing the weighted flash fragmentation factor for each logical block address range in the data storage device using a buffer selected from:
a host managed buffer; and
a controller memory buffer.

7. The method of claim 1, wherein the determining the weighted flash fragmentation factor is responsive to receiving a request to calculate the weighted flash fragmentation factor for the logical host block address of the proposed storage operation.

8. The method of claim 1, wherein the tier selection for the proposed storage operation is based on:
an anticipated access frequency of data in the proposed storage operation; and
the weighted flash fragmentation factor.

9. The method of claim 1, further comprising:
identifying, responsive to the proposed storage operation from the host device, a gap in logical block addresses in the logical-to-physical mapping table; and
requesting that future data be stored in the data storage device according to the gap in the logical block addresses in the logical-to-physical mapping table.

10. The method of claim 1, further comprising:
identifying, responsive to the proposed storage operation from the host device, a logical block address range of a fragment of data that is included in another range of logical block addresses; and
requesting that the fragment of data be moved to a tier different than the data storage device.

11. A data storage device, comprising:
a processor;
a memory;
a logical-to-physical mapping table configured to store a mapping of logical block addresses to physical addresses of storage device media;
a fragmentation manager, stored in the memory for execution by the processor, configured to:
determine, responsive to a proposed storage operation from a host device targeting a host logical block address, a weighted flash fragmentation factor for the data storage device, wherein the weighted flash fragmentation factor:
is a function of:
a change in a quantity of sense operations; and
a change to a number of entries in the logical-to-physical mapping table; and
indicates a severity of fragmentation in the storage device media based on a logical block address range of data to be stored in the storage device media; and
share the weighted flash fragmentation factor with the host device for use by the host device in a tier selection for the proposed storage operation; and
a multi-tier memory mapping module, stored in the memory for execution by the processor, configured to:
receive, responsive to the tier selection by the host device, the proposed storage operation; and
execute, by the data storage device, the proposed storage operation.

12. The data storage device of claim 11, wherein the weighted flash fragmentation factor is based on a difference in access time of previously stored data in the data storage device.

13. The data storage device of claim 12, wherein the difference in access time is based on the change in the quantity of sense operations in the data storage device.

14. The data storage device of claim 12, wherein the weighted flash fragmentation factor is further based on a proposed change to the logical-to-physical mapping table of the data storage device corresponding to the proposed storage operation.

15. The data storage device of claim 11, wherein to generate the weighted flash fragmentation factor further comprises generating the weighted flash fragmentation factor for each logical block address range in the storage device media.

16. The data storage device of claim 11, wherein to share the weighted flash fragmentation factor to the host device comprises sharing the weighted flash fragmentation factor for each logical block address range in the data storage device in one of:
a host managed buffer; and
a controller memory buffer.

17. The data storage device of claim 11, wherein to generate the weighted flash fragmentation factor is in response to receiving a request to calculate the weighted flash fragmentation factor for a logical block address of data.

18. The data storage device of claim 11, wherein the tier selection for the proposed storage operation is based on:
an anticipated access frequency of data in the proposed storage operation; and the weighted flash fragmentation factor.

19. The data storage device of claim 18, further comprising:
a relocation module, stored in the memory for execution by the processor, configured to:
identify a gap in logical block addresses in the logical-to-physical mapping table in the data storage device;

identify a logical block address range of a fragment of data that is included in another range of logical block addresses; and request the fragment of data be moved to a tier different than the data storage device.

20. A data storage device, comprising:

a non-volatile storage medium;

means for determining, responsive to a proposed storage operation from a host device targeting a host logical block address, a weighted flash fragmentation factor for the data storage device, wherein the weighted flash fragmentation factor:

is a function of:

a change in a quantity of sense operations; and a change to a number of entries in a logical-to-physical mapping table; and indicates a severity of fragmentation in a storage device media of the data storage device;

means for sharing the weighted flash fragmentation factor with the host device for use by the host device in a tier selection for the proposed storage operation;

means for receiving, responsive to the tier selection by the host device, the proposed storage operation; and means for executing, by the data storage device, the proposed storage operation.

\* \* \* \* \*